United States Patent [19]
Wyatt et al.
[11] Patent Number: 4,472,053
[45] Date of Patent: Sep. 18, 1984

[54] METHOD AND APPARATUS FOR MEASURING THE DURATION OF OPTICAL RADIATION PULSES

[75] Inventors: Richard Wyatt, Ipswich, England; Ernesto E. Marinero, Menlo Park, Calif.

[73] Assignee: Max-Planck-Gesellschaft zur Förderung der Wissenschaften e.V., Goettingen, Fed. Rep. of Germany

[21] Appl. No.: 354,244

[22] Filed: Mar. 3, 1982

[30] Foreign Application Priority Data

Mar. 4, 1981 [DE] Fed. Rep. of Germany ....... 3108177

[51] Int. Cl.[3] ......................... G01J 9/00; G04F 13/02
[52] U.S. Cl. .................................... 356/121; 356/353
[58] Field of Search .............................. 356/121, 353; 350/162.11, 162.17

[56] References Cited

FOREIGN PATENT DOCUMENTS 2034186 1/1971 Fed. Rep. of Germany .

OTHER PUBLICATIONS

*Optics Communications*, vol. 29, No. 2, May 1979 at 239.
*Optics Communications*, vol. 23, No. 3, Dec. 1977 at 293.
*Optics Communications*, vol. 30, No. 3, Sep. 1979 at 453.

*Primary Examiner*—R. A. Rosenberger
*Attorney, Agent, or Firm*—Brumbaugh, Graves, Donohue & Raymond

[57] ABSTRACT

An extension of the noncollinear second harmonic generation technique for pulse autocorrelation measurements is described. A diffraction-grating is used to produce a tailored, expanded beam, with a differential time delay along its expanded axis. When this beam is combined with an inverted replica of itself at the frequency-doubling crystal, the monitored spatial profile of the generated second harmonic beam gives directly the duration of the incident laser pulse. A time resolution of better than 1 picosecond (ps) is obtained at 500 nanometers (nm), and a total measurement range of ~80 ps. The optical system here described enables the extension of the measurement range in a simple manner.

10 Claims, 7 Drawing Figures

METHOD AND APPARATUS FOR MEASURING THE DURATION OF OPTICAL RADIATION PULSES

The present invention relates to the measurement of single pulses of optical radiation, more specifically to the measurement of the duration of single, ultrashort laser pulses.

REFERENCES (1) A. J. de Maria, D. A. Stetser, H. Heynau: Appl. Phys. Lett. 8, 174 (1966)

(2) H. P. Weber: J. Appl. Phys. 38, 2231 (1967)

(3) J. A. Armstrong: Appl. Phys. Lett. 10, 16 (1967)

(4) J. A. Giordmaine, P. M. Rentzepis, S. L. Shapiro, K. W. Wecht: Appl. Phys. Lett. 11, 216 (1967)

(5) Ultrashort Light pulses, Ed. S. L. Shapiro, Topics in Appl. Phys. V. 18, Springer Verlag (6) M. Maier, W. Kaiser, J. A. Giordmaine: Phys. Rev. Lett. 17, 1275 (1966)

(7) D. J. Bradley, B. Liddy, W. E. Sleat: Opt. Commun. 2, 391 (1971)

(8) R. N. Gyuzalian, S. B. Sogomonian. Z. Gy. Horvath: Opt. Commun. 29, 239 (1979)

(9) J. Janszky, G. Conradi, R. N. Gyuzalian: Opt. Commun. 23, 293 (1977)

(10) C. Kolmeder, W. Zinth, W. Kaiser: Opt. Commun. 30, 453 (1979)

THE PRIOR ART

Since the developement of the modelocked Nd:glass laser (1), a number of methods have been proposed to measure the duration of ultrashort pulses. In the first experiments, pulse durations were determined by measuring the second order autocorrelation function of the laser pulse, by making use of a nonlinear effect, such as second harmonic generation, or two-photon induced fluorescence (2,3,4,5). Second harmonic generation, using two orthogonally polarized beams, or, later, crossed beams of the same polarization (6), produces the required autocorrelation function directly, as the relative delay between the two beams is altered, but requires many laser shots to map out the complete autocorrelation function. The two-photon fluorescence (TPF) technique (4), on the other hand, allows measurement of the complete autocorrelation function for a single laser pulse, but the continuous background signal produced by each individual beam gives a maximum contrast ratio of 3:1 between the maximum value of the autocorrelation function, and the backgrouund level, which does not allow weak pulses near the main pulse to be seen. The scarcity of efficient TPF media limits the spectral regions where this method can be used. In spite of these limitations, the TPF technique remains in wide use because of its single shot measurement capability.

The development of the picosecond streak camera (7) allowed the structure of the laser pulse to be seen directly for the first time with picosecond resolution.

However, in addition to its prohibitive cost, the streak camera is restricted to the near UV to near IR spectral region, maximum temporal resolution only being obtained near the photocathode cut-off wavelength. Recently, in an attempt to combine the single-shot measurement capability of the two-photon fluorescence method, and the zero background inherent to the second harmonic generation technique, Gyuzalian et al. (8, 9) and later Kolmeder et al. (10) used a noncollinear second harmonic generation arrangement, and, by resolving the spatial distribution of the generated second harmonic beam, were able to obtain directly the temporal autocorrelation function of each individual input pulse. While this technique can offer very high temporal resolution, wavelength coverage is limited as choice of nonlinear crystal is severely restricted by the extreme phasematching requirements if a reasonably large total measurement period is to be obtained.

THE INVENTION

The present invention provides for a new method and apparatus for measuring the duration of single pulses of optical radiation which use a new type of the noncollinear second harmonic generation method complementary to (8, 9, 10), which has no special requirements as regards choice of doubling crystal, and can therefore be used in any wavelength range for which doubling crystals are normally available. Large measurement intervals are also possible without an unduly large crystal aperture; the same crystal can be used either to measure pulses of a few picoseconds duration or look at events over a period of several hundred picoseconds, providing a versatile pulse measurement system.

SHORT DESCRIPTION OF THE DRAWINGS

Figure 1:
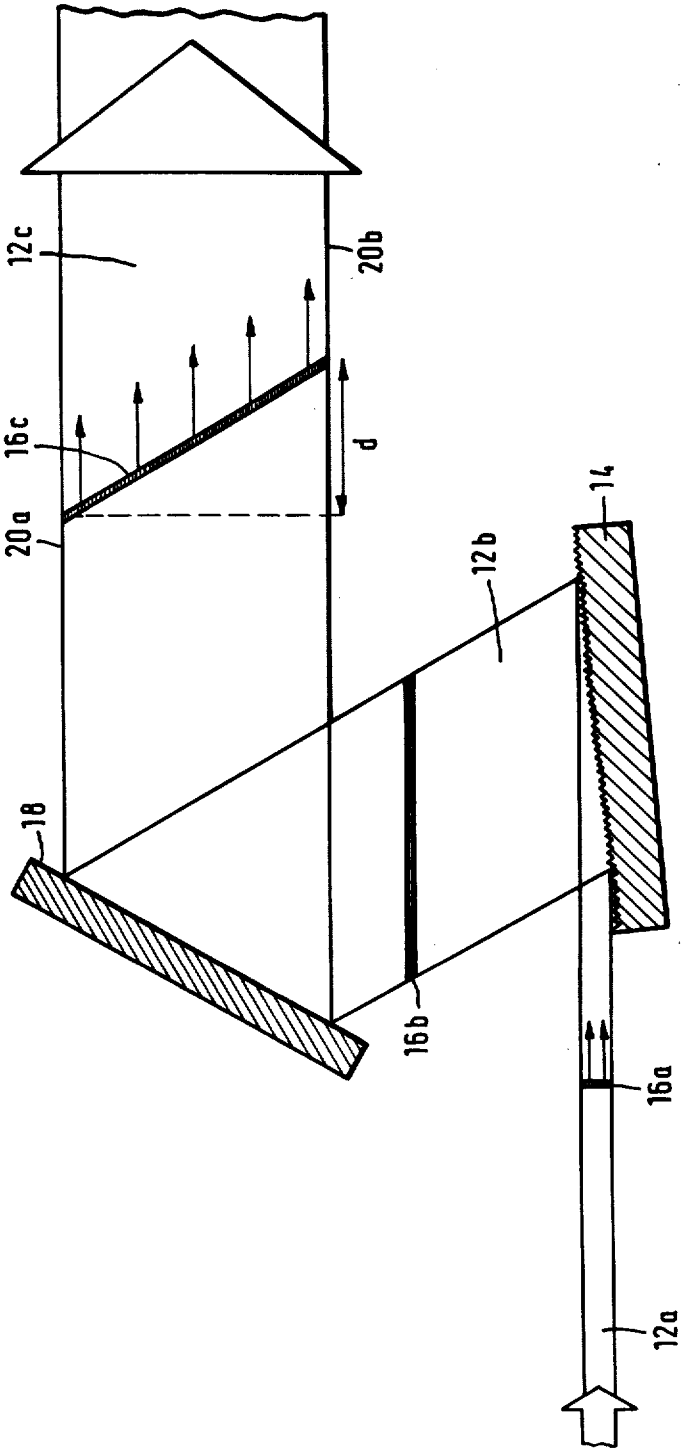
FIG. 1 is a simplified view of a diffraction grating used to provide beam expansion and differential time delay.

The basic concept of the invention is illustrated in FIG. 1. A laser pulse forming an input radiation beam 12*a* is projected with grazing incidence on a diffraction grating 14 serving as a one-dimensionally effective beam expander to expand the input beam to a diffracted exit beam 12*b* expanded in a predetermined width direction (in the plane of FIG. 1). Concurrently, the diffraction grating introduces a continuous differential time delay dependent upon the spatial width co-ordinate of the beam, i.e. the rays of the beam are progressively delayed across the beam 12*b*. Thus, while the input beam 12*a* has a wave front 16*a* which is essentially normal to the propagation direction, the wave front 16*b* in the diffracted beam 12*b* is oblique to the propagation direction. The diffracted beam 12*b* is redirected into the original direction of the input beam 12*a* by a plane mirror 18, to obtain a reflected beam having a wave front 16*c* oblique to the direction of propagation. Thus, a ray 20*a* at the upper margin of the beam is delayed with respect to a ray 20*b* at the lower margin of the beam in FIG. 1 by a predetermined period of time corresponding to a length of propagation d. By comparing this tailored beam forming the laser pulse with a spatially inverted replica of itself, using collinear second harmonic generation, the temporal autocorrelation function is given by the spatial distribution of the collimated second harmonic beam; a second harmonic signal is only produced when the beam and its replica overlap in space and time. By introducing a variable magnification imaging system between the beam-expanding element and a nonlinear crystal effecting the second harmonic generation, it is possible to measure the duration of pulses of sub picosecond or sub nanosecond duration with the same experimental set-up, as required.

Figure 2:
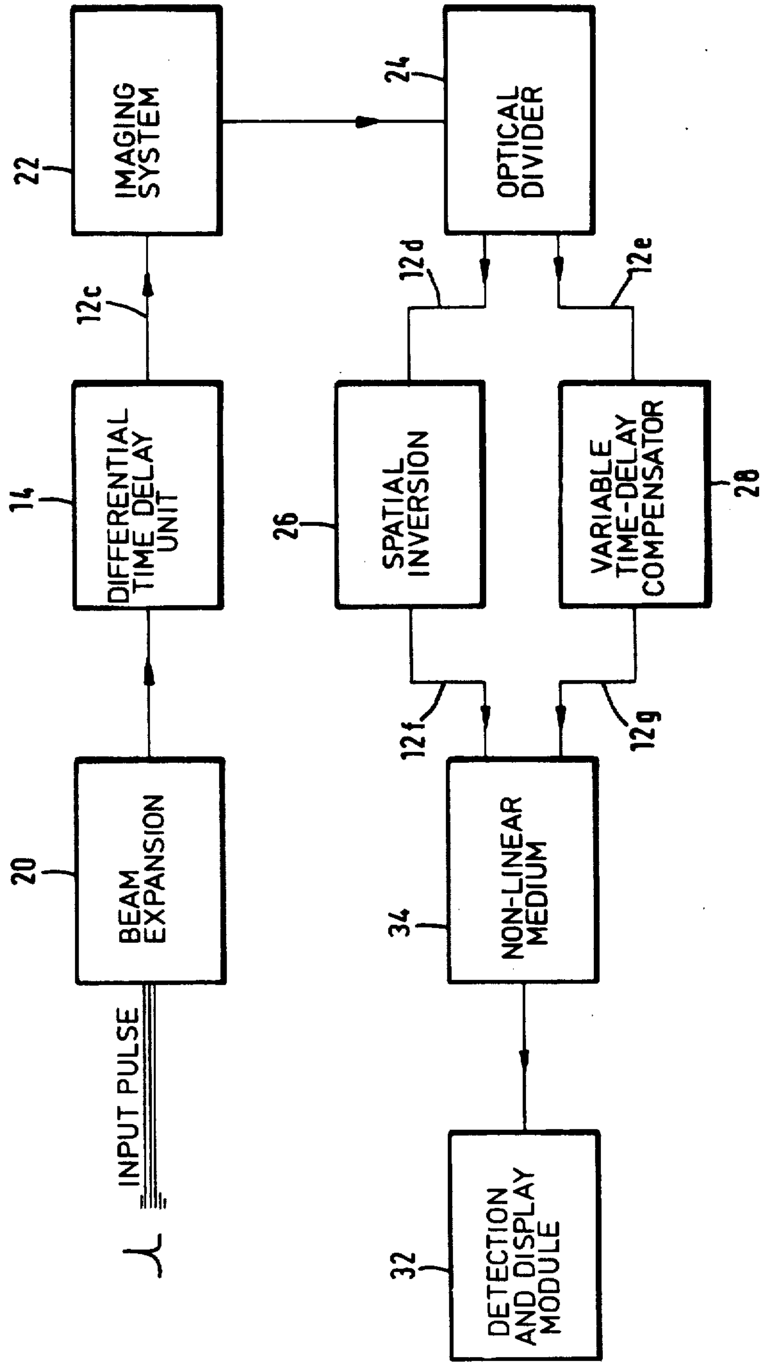
FIG. 2 is a block diagram of an optical system for measurement of temporal autocorrelation function for a single laser pulse.

This sequence of operations is diagrammatically shown by the block diagram of FIG. 2. An input pulse forming a collimated beam **12*a* may be pre-expanded by a beam expander 20, which may comprise a prism. The beam is then acted upon by a differential time delay unit 14 comprising a diffraction grating which expands the beam in a width direction, which is in a plane normal to the lines of the grating, and simultaneously differentially delays the beam across the width direction. The differentially delayed, tailored beam 12*c* is transmitted by an imaging system 22 to a beam splitter or optical divider 24 by which it is split into two coherent component beams 12*d* and 12*e*. One of that component beams, for example, component beam 12*d*, is spatially inverted by an optical inverter 26, which may comprise a Dove prism. The other component beam 12*e* is transmitted through a variable time-delay compensator 28 for compensating the delay introduced by the inverter 26. The inverted component beam 12*f* and the delayed component beam 12*g* are then caused to interact in an optically nonlinear medium 34, to produce a second harmonic beam 12*h*. The spatial energy distribution of the second harmonic radiation beam 12*h* is detected and displayed by an electrooptical detection and display module 32**, to display the desired autocorrelation function.

Figure 3:
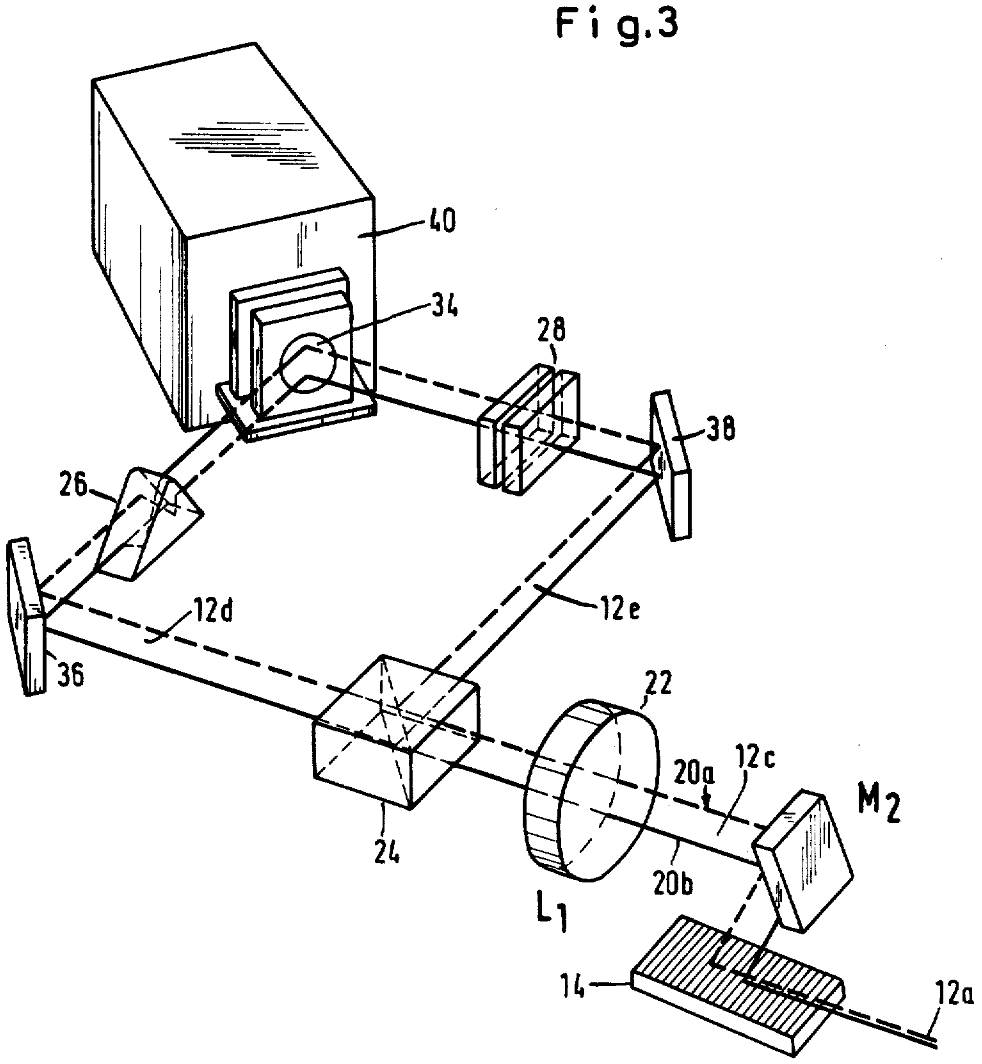
FIG. 3 shows the essential components of a preferred measurement system, in accordance with the present invention. (Crossing angle in figure is exaggerated, and recollimating lens is omitted for clarity.)

The layout of the essential elements of a preferred apparatus for implementing the invention is shown in FIG. 3. The grating 14 is a 3050 lines/mm holographic grating used near grazing incidence. A 30 mm section of the grating was illuminated by an input beam **12*a* of approximately 2 mm diameter. The imaging system 22 may consist of a 20 cm focal length achromatic doublet lens $L_1$, placed 40 cm from both grating 14 and crystal 34. However, preferably an imaging system 22** is used, the focal length of which is adjustable, e.g. from about 10 to about 50 cm.

The beam splitter 24 is a frustrated-total-internal-reflexion beam splitter producing two equal intensity replicas of the incident beam. These component beams **12*d*, 12*e* were directed into the non-linear crystal 34 by means of two mirrors 36, 38, the crossing angle $\alpha$ of the two beams being set to about 10° external to the crystal, although this angle is not critical. Component beam 12*d* is transmitted to a Dove prism 26 for spatial invertion. To equalize the time delays in the optical pass of the two component beams, component beam 12*e* is transmitted through compensating glass blocks 28. The exact thickness of the compensating blocks 28 can be altered slightly to shift the point at which zero relative delay between the two beams occurs. In this way, only one half of the autocorrelation function need be seen, doubling the effective time coverage of the system. Ideally, no information is lost by this, as the autocorrelation function has mirror symmetry about zero delay. A 1 cm cube of lithium formate monohydrate was used as nonlinear medium 34 to generate the second harmonic by interaction of the component beams. The crystal was cut with the optical axis at 45 degrees to the normal to the input phase, giving a necessary rotation of 7,5 degrees to obtain phasematching at 500 nm. A 20 cm focal length lens (not shown in FIG. 3) was placed immediately in front of the doubling crystal 34**, to recollimate the beams. The generated second harmonic beam was separated spatially from the fundamental by means of a slit, and spectrally by UG5 glass filters. The spatial distribution of the frequency-doubled output was measured with a B and M SPEKTRONIK OSA 500 system. This system comprises a vidicon, which was fitted with an U.V. scintillator to extend its operating range below 300 nm. A simple scanning diode array could equally be used for this purpose.

The apparatus described was tested with single picosecond pulses at 5000 nm which were produced with diffraction-limited spatial quality, from a passively mode-locked, flashlamp-pumped dye laser followed by $N_2$-laser and KrF-laser-pumped amplifier stages. The input beam **12*a* of approximately 2 mm diameter was expanded about 15 times by the grating 14**.

Figure 4:
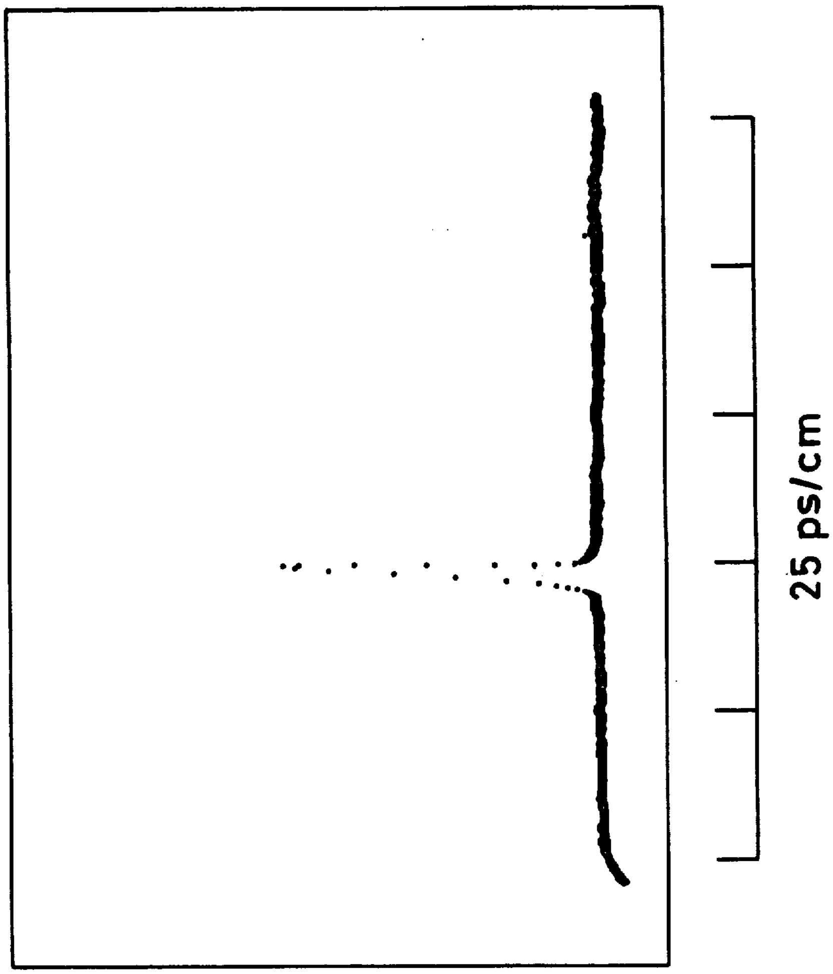
FIG. 4 is a typical output signal of the system of FIG. 3 for a single picosecond pulse, showing zero background.
Figure 5:
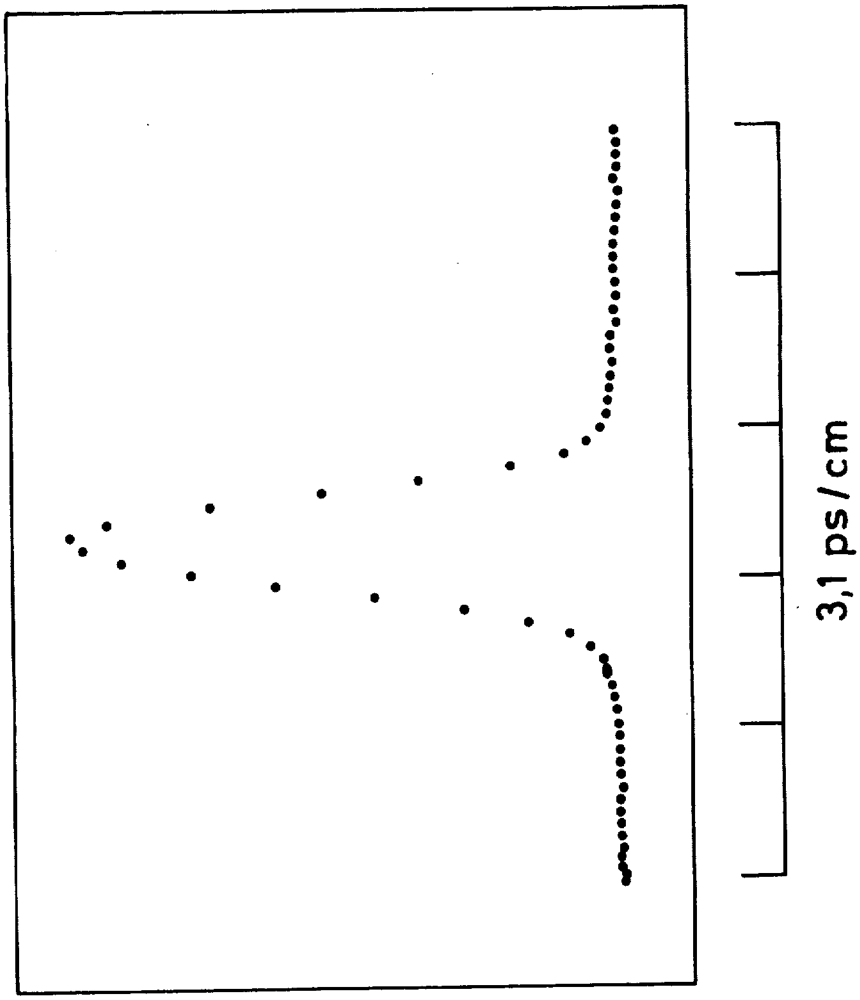
FIG. 5 is a typical output signal for a single picosecond pulse with expanded time scale (A pulse duration of 1, 3 ps is inferred from the profile)
Figure 6:
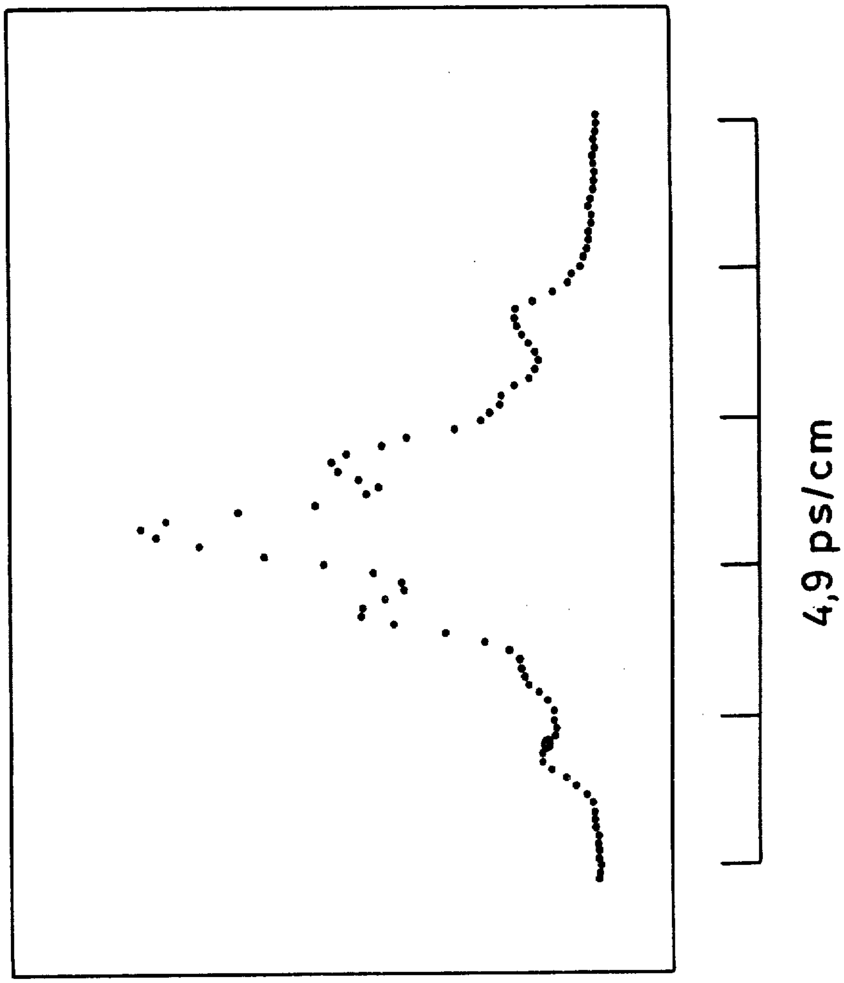
FIG. 6 is an autocorrelation measurement of a poorly modelocked pulse, showing substructure.
Figure 7:
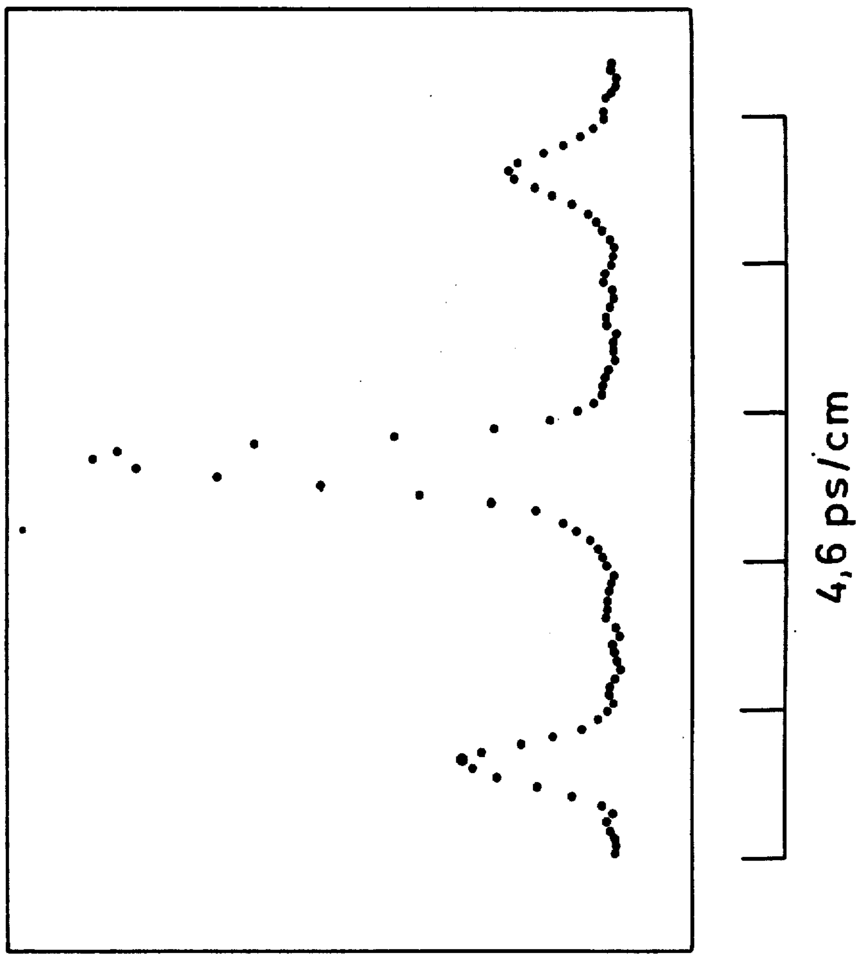
FIG. 7 is an autocorrelation trace with 1 mm solid silica etalon in input beam, to give calibration markers. Note the absence of background between pulses.

Typical recorded autocorrelation profiles are shown in FIGS. 4 to 7. FIGS. 4 and 5 show a single, isolated picosecond pulse, clearly illustrating the zero background capability of this technique. In FIG. 6 the SHG profile of a badly mode-locked pulse is shown. The photograph shows considerable sub-structure, and illustrates the possibility of detecting small amounts of energy in the pulse wings, as there is no background signal from each beam individually. Finally, FIG. 7 shows the autocorrelation function obtained when a 1 mm thick fused silica etalon, with about 50% reflectivity, is placed in the optical pass of the input beam. The etalon generates a train of input pulses, enabling accurate calibration of the time scale provided that the etalons thickness is well-known.

The autocorrelation width of the laser pulse in FIG. 6 is measured as 1,5 ps, which corresponds to an actual pulse duration of about 1 ps, assuming a $\text{sech}^2$ pulse shape (5). This single-shot measurement is in good agreement with pulse-width determination carried out previously using a conventional SHG autocorrelation method necessitating, however, as many as 500 laser pulses.

The temporal resolution can be extended if required, by greater beam expansion and a change in magnification of the imaging system. The profiles of FIGS. 4 to 6 were obtained with an input pulse energy of about 50 $\mu$J and show excellent signal-to-noise ratio. A more-efficient doubling crystal, such as lithium iodate (in a suitable wavelength region) would allow much lower energies to be used.

The overall performance of the system described with reference to FIG. 3 can be improved considerably by several modifications. The losses associated with using a grating near grazing incidence are quite high; an improvement is obtained by pre-expanding the input beam with a low-loss prism beam-expander 20 (FIG. 2), and using the grating near the Littrow configuration, separating the expansion and delay function. A second imaging system between the doubling crystal and the vidicon of the detection system 32 will allow further flexibility in choosing the other system parameters, and also ensure that no broadening of the spatial energy distribution of the second harmonic beam occurs, as it travels from the doubling crystal to the detection system. Such broadening may occur without an additional imaging system if, for example, a large spread of frequencies is present in the input beam. Although the primary imaging system 22 ensures that all wavelengths leaving the grating 14 arrive at the same place on the doubling crystal 34, they will each enter the crystal at a slightly different angle, and, if a thin crystal, with large acceptance bandwidth, is used, a divergent second harmonic beam would be produced.

It should also be noted that large differential time delays are easily obtained using only moderate-sized gratings; a 10 cm grating in near-Littrow configuration could produce about 1 ns overall delay for reasonable angles of incidence near 45°, as the spatial inversion introduced by the Dove prism 26 doubles the total measurement range. Further, the optical system may comprise an additional grating or prism to compensate for the chromaticity of the arrangement. It should further be noted that the above mentioned value of about 10° between the component beams approaching the crystal is only exemplary. In practice, the crossing angle and the width of the interacting component beams should be minimized for obtaining maximum resolution.

Summarizing, a versatile sub-nanosecond to picosecond pulse measurement technique has been described, which makes use of the differential time delay introduced by diffraction grating to produce a background-free autocorrelation function for a single incident laser pulse. The overall system measurement range is easily tailored to suit individual requirements, in contrast to previous techniques. The modest phase-matching requirements allow the use of most commonly available crystals for producing the second harmonic, and the wavelength, which extends, therefore, from the blue to beyond 10 μm in the infrared, with the correct choice of grating, nonlinear crystal, and linear detector.

It would be apparent from the description of the invention given above that further modifications and alternative forms may be developed without departing from the spirit of the invention. Thus, it is intended that the true scope of the invention be limited only by the following claims.

We claim:

1. A method of measuring the duration of individual pulses of optical radiation forming a coherent input beam comprised of essentially parallel rays, said beam having a predetermined width in the direction normal to a direction of propagation of said beam, said method comprising the steps of (a) differentially delaying the rays of said beam such that the delay of the rays increases progressively in the direction across the beam, to produce a beam having a wave-front extending obliquely to said direction of propagation;

(b) dividing said delayed beam obtained by step (a) into two coherent component beams;

(c) spatially inverting one of said component beams in said width direction;

(d) causing interaction in an optically non-linear medium of said inverted and the other component beams to produce a second harmonic output beam, and (e) determining the spatial energy distribution across said output beam.

2. The method as claimed in claim 1 characterized by the additional step of expanding said input beam in said width direction, that additional step being performed before step (a).

3. A method as claimed in claim 1 characterized by the additional step of expanding said input beam in said width direction, that additional step being performed simultaneously with step (a) with the use of a diffraction grating.

4. The method as claimed in any of claims 1, 2 and 3 characterized by the step of delaying the other component beam, the delay being chosen to provide a predetermined relationship of overlap of that component beams in said non-linear medium.

5. An apparatus for measuring the duration of individual pulses of optical radiation forming a coherent input beam comprised of essentially parallel rays, said beam having a predetermined width in the direction normal to a direction of propagation of said beam, said apparatus comprising:

means for differentially delaying said beam such that the delay of the rays increases progressively in the direction across the beam, to produce a beam having a wave-front extending obliquely to said direction of propagation;

means for dividing said delay beam into first and second component beams;

means for spatially inverting, in said width direction, said first component beam relative to said second component beam;

an optically non-linear medium;

means for directing said inverted first component beam and said second component beam into said non-linear medium with a relationship adapted to produce the second harmonic output beam, and means for determining the spatial energy distribution across said output beam.

6. The apparatus as claimed in claim 5 wherein said delaying means is a diffraction grating.

7. The apparatus as claimed in claim 6 wherein said diffraction grating is used in a configuration in which the diffracted mean is approximately coincident with but in the opposite direction to the incident beam.

8. The apparatus as claimed in claim 5 further comprising means for adjusting the delay of said second component beam.

9. The apparatus as claimed in claim 5 wherein said inverting means comprises a Dove prism.

10. The apparatus as claimed in claim 5 characterized by an optical image system positioned in the path of the delayed beam between said delay means and said dividing means.

* * * * *